United States Patent [19]

Norimatsu

[11] Patent Number: 5,640,686

[45] Date of Patent: Jun. 17, 1997

[54] RADIO COMMUNICATION DEVICE CAPABLE OF COMMUNICATION IN A PLURALITY OF COMMUNICATION SYSTEMS

[75] Inventor: Hidehiko Norimatsu, Tokyo, Japan

[73] Assignee: NEC Corporation, Japan

[21] Appl. No.: 440,215

[22] Filed: May 12, 1995

[30] Foreign Application Priority Data

May 13, 1994 [JP] Japan .................................. 6-123308

[51] Int. Cl.$^6$ ................................................ H04B 1/40
[52] U.S. Cl. .............................. 455/74; 455/33.1; 455/89
[58] Field of Search ............................ 455/74, 89, 33.1, 455/54.1, 115, 90, 93; 379/58, 59

[56] References Cited

U.S. PATENT DOCUMENTS

| 5,029,233 | 7/1991 | Metroka | 455/11 |
|---|---|---|---|
| 5,155,860 | 10/1992 | McClure | 455/89 |
| 5,175,872 | 12/1992 | Borras | 455/76 |
| 5,228,074 | 7/1993 | Mizikovsky | 379/59 |
| 5,249,302 | 9/1993 | Metroka et al. | 455/11.1 |
| 5,422,931 | 6/1995 | Austin-Lazarus et al. | 379/59 |
| 5,487,182 | 1/1996 | Hansson | 455/90 |

FOREIGN PATENT DOCUMENTS

| 398056 | 4/1990 | European Pat. Off. |
|---|---|---|
| 435664 | 12/1990 | European Pat. Off. |
| 541305 | 10/1992 | European Pat. Off. |
| 608899 | 1/1994 | European Pat. Off. |
| 4119094 | 6/1991 | Germany |
| 5-252107 | 9/1993 | Japan |
| 6-21880 | 1/1994 | Japan |

*Primary Examiner*—Reinhard J. Eisenzopf
*Assistant Examiner*—Lee Nguyen
*Attorney, Agent, or Firm*—Ostrolenk, Faber, Gerb & Soffen, LLP

[57] ABSTRACT

A radio communication device which is capable of effecting communications in different communication systems and is highly advantageous economically has a main communication unit capable of effecting communications in a first digital cellular communication system (GSM), and an additional unit to be attached to said main communication unit for effecting communications in a second digital cellular communication system (PCN) which differs from said first digital cellular communication system. The main communication unit includes variable-bandwidth filters compatible with both GSM and PCN. The additional unit comprises a power amplifier, and the main communication unit has a power amplifier. Switching can be made between these power amplifiers to make the radio transmission device compatible with both GSM and PCN. The radio communication device has many components shared by GSM and PCN and hence is highly economical.

4 Claims, 2 Drawing Sheets

RADIO COMMUNICATION DEVICE CAPABLE OF COMMUNICATION IN A PLURALITY OF COMMUNICATION SYSTEMS

BACKGROUND OF THE INVENTION

1. Field of the Invention

The present invention relates to a portable radio communication device for digital cellular communication, and more particularly to a radio communication device capable of communication with other digital cellular communication systems.

2. Description of the Related Art

As various communication systems are available in recent years, there have been proposed communication devices that are compatible with different communication systems. For example, a communication device disclosed in Japanese laid-open patent publication No. 6-21880 has a main communication unit which operates with a cellular communication system or a digital cellular communication system, and which can be made compatible with another cellular communication system or another digital cellular communication system by the addition of an auxiliary communication unit.

Japanese laid-open patent publication No. 5-252107 reveals a communication device that operates as an analog mobile telephone set by itself and, when combined with an extended-service radio unit, can operate as a digital mobile telephone set capable of transmitting and receiving digital radio signals.

The disclosed communication devices are composed of either a main communication unit with an added auxiliary communication unit or an analog mobile telephone set with an added extended-service radio unit. These prior communication devices are made compatible with different communication systems by connecting independently operable units to each other, and their compatible circuit arrangement includes independent systems that are positioned between a certain point in a signal system which is continuously connected and an antenna. Even though the compatible circuit arrangement includes shared components, those independent systems are composed of independent components that are common, but not shared by the systems. As a result, the compatible circuit arrangement has not been economical as it has two sets of common components respectively in the independent systems.

If the common components were to be shared by the independent systems, then the number and length of signal paths through the common components between the independent systems would be so large that the communication devices would have their characteristics degraded particularly when handling high-frequency signals. Recent communication devices which have a hybrid arrangement of components would be made too complicated by a shared use of such common components between independent systems thereof.

Therefore, communication devices that are compatible with different communication systems are preferably provided with systems dedicated to those different communication systems for economic and characteristic reasons. However, some digital communication systems, e.g., some digital cellular communication systems, differ from each other only with respect to their frequencies, output powers, and control protocols. Adding dedicated systems to make communication devices compatible with those digital communication systems is not economically preferable. Therefore, it has been desirable to make efforts to share certain common components between systems which provide compatibility with those digital communication systems.

SUMMARY OF THE INVENTION

It is an object of the present invention to provide a radio communication device which is compatible with different communication systems and is economically advantageous.

Another object of the present invention is to provide a radio communication device which is compatible with different cellular systems and is economically advantageous.

According to the present invention, there is provided a radio communication device comprising a main communication unit capable of effecting communications in a first digital cellular communication system, and an additional unit to be attached to the main communication unit for effecting communications in a second digital cellular communication system which differs from the first digital cellular communication system, the main communication unit including a first component having a function which is the same as a function of the additional unit, and other components compatible with both the first digital cellular communication system and the second digital cellular communication system, the arrangement being such that switching is made from the first component to the additional unit when the additional unit is attached to the main communication unit.

The main communication unit may comprise a transmission system including a power amplifier as the first component compatible with the first digital cellular communication system, a variable-bandwidth filter having a bandwidth variable depending on the first digital cellular communication system and the second digital cellular communication system, and a central processing unit having a protocol which can be changed depending on the first digital cellular communication system and the second digital cellular communication system. The additional unit may comprise a power amplifier compatible with the first digital cellular communication system, the arrangement being such that switching can be made between the power amplifier in the transmission system and the power amplifier of the additional unit.

The main communication unit may comprise a detector for detecting when the additional unit is attached to the main communication unit, the arrangement being such that when a detection is outputted from the detector, the central processing unit varies the bandwidth of the variable-bandwidth filter and changes the protocol of the central processing unit, and effects switching between the power amplifier in the transmission system and the power amplifier of the additional unit.

Communications in the first digital cellular communication system can be carried out by the main communication unit only, and communications in the second digital cellular communication system can be carried out when some of the components of the main communication unit and the protocol thereof are changed to match the second digital cellular communication system and one of the components is switched to the additional unit. Therefore, the radio communication device is capable of communications in the first and second communication systems which are different from each other, and the radio communication device has many shared components and hence offers economic advantages.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
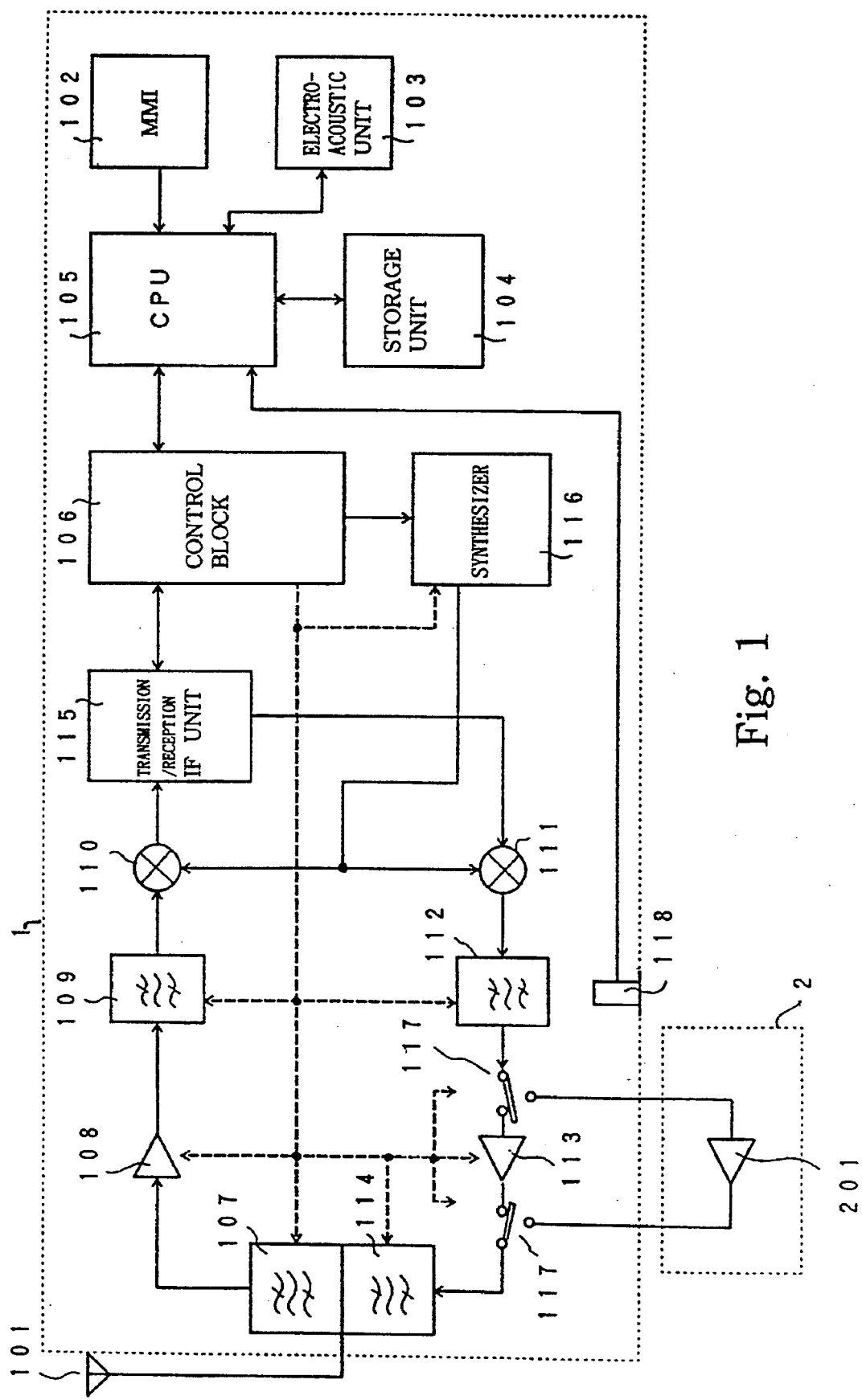
FIG. 1 is a block diagram of a radio communication device according to the present invention.

As shown in FIG. 1, a radio communication device according to the present invention generally includes a main communication unit 1 and an additional unit 2 added to the main communication unit 1. The main communication unit 1, to which an antenna 101 is connected, includes a man-machine interface (MMI) 102 having a keyboard and a display, an electroacoustic unit 103 composed of a transmitter and receiver for converting a speech signal into an electric signal and vice versa, a storage unit 104 composed of a ROM (read-only memory) and a RAM (random-access memory) for storing certain data, a CPU (central processing unit) 105 for controlling the radio communication device according to communication protocols, and a control block 106 for controlling receiving and transmitting systems (described below) under the control of the CPU 105.

The receiving system includes a filter 107 connected to the antenna 101 for limiting the frequencies of a Signal received from the antenna 101 to a certain bandwidth an amplifier 108 for amplifying the received signal, a filter 109 for removing interference noise from the amplified signal, and a mixer 110 for frequency-converting the received signal into a received IF (intermediate-frequency) signal. The transmitting system includes a mixer 111 for frequency-converting a transmission IF signal into a high-frequency signal, a filter 112 for limiting the frequencies of the high-frequency signal to a first bandwidth, a power amplifier 113 for amplifying the high-frequency signal up to a certain high-frequency power level, and a filter 114 connected to the antenna 101 for limiting the frequencies of the amplified high-frequency signal to a final bandwidth. The power amplifier 113 has a power output level of 2 W.

The main communication unit 1 also includes a common system that is shared by the receiving system and the transmitting system. The common system has a transmission/reception IF unit 115 for processing the received IF signal and the transmission IF signal, and a synthesizer 116 for supplying a local signal to the mixers 110, 111. The synthesizer 116 has its oscillation frequency variable by a control signal from the control block 106.

Each of the filters 107, 109, 112, 114 comprises a variable-band filter whose bandwidth can be controlled by a control signal from the control block 106. The power amplifier 113 has input and output terminals connected to terminals of a selector switch 117 which is connected between the filters 112, 114 and operable by a control signal from the control block 106. The additional unit 2 has a power amplifier 201 having input and output terminals connected to other terminals of the selector switch 117 in bypassing relation to the power amplifier 113.

The main communication unit 1 also has a detector 118 for detecting when the additional unit 2 is added to the main communication unit 1. The detector 118 applies a detected signal to the CPU 105. The detector 118 may comprise a limit switch, a photointerrupter, or the like, and detects when the additional unit 2 is attached to a casing of the main communication unit 1.

Figure 2:
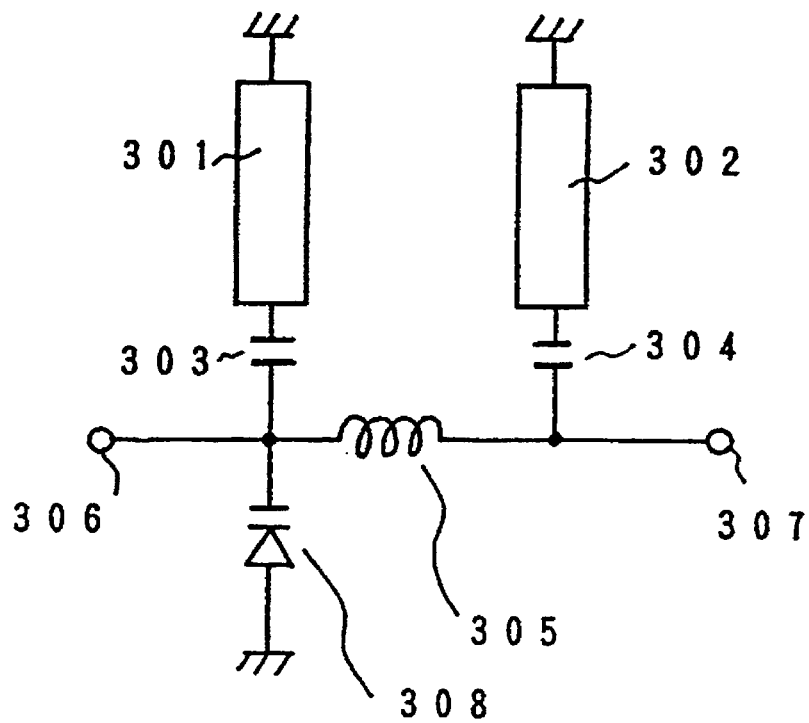
FIG. 2 is a circuit diagram of a variable-band filter in the radio communication device shown in FIG. 1.

One example of the variable-band filter of each of the filters 107, 109, 112, 114 is shown in FIG. 2. The variable-band filter includes a pair of resonators 301, 302 connected respectively to a pair of capacitors 303, 304 which are connected to each other by a coil 305. The coil 305 has its terminals connected respectively to an input terminal 306 and an output terminal 307, the input terminal 306 being also connected to a varactor diode 308. When a bias is applied from the input terminal 306, the capacitance of the varactor diode 308 is varied to vary bandwidth characteristics between the input and output terminals 306, 307.

Figure 3:
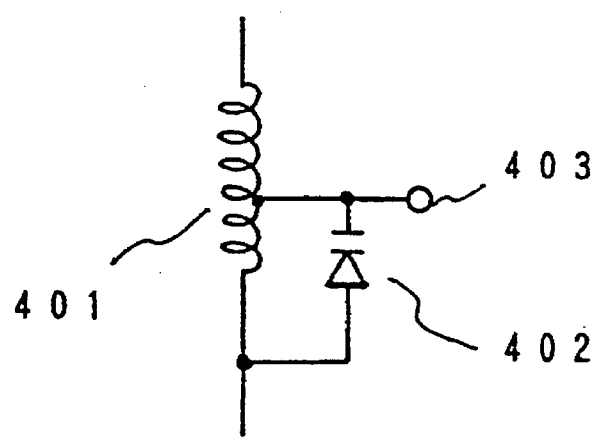
FIG. 3 is a circuit diagram of a variable inductor that can be used in the variable-band filter.

FIG. 3 shows a variable inductor by way of example. The variable inductor includes a coil 401 having an intermediate tap to which a varactor diode 402 and a control input terminal 403 are connected. The inductance of the coil 401 can be varied by a bias which is applied from the control input terminal 403. The variable inductor shown in FIG. 3 may be incorporated in the variable-band filter shown in FIG. 2.

The power amplifier 201 of the additional unit 2 has a power output level different from that of the power amplifier 113 of the main communication unit 1. For example, the power amplifier 201 has a power output level of 1 W.

The additional unit 2 may be attached to the casing of the main communication unit 1 by a connector or the like. When the additional unit 2 is attached to the casing of the main communication unit 1, the power amplifier 201 is connected to the other terminals of the selector switch 117, and the detector 118 sends a detected signal to the CPU 105.

Operation of the radio transmission device will be described below. A speech signal applied to the transmitter of the electroacoustic unit 103 is converted thereby into an electric signal, which is converted into a digital signal inherent with the radio transmission device by the CPU 105 and the control block 106. The digital signal is modulated and bandwidth-limited by the transmission/reception IF unit 115 and then delivered to the mixer 111. The mixer 111 mixes the signal from the transmission/reception IF unit 115 with a local signal that is supplied from the synthesizer 116 under the control of the control block 106, thereby producing a signal of a circuit frequency. The local signal is controlled into a frequency matching a communication channel that is required. The frequency-converted signal from the mixer 111 is then sent through the filter 112 to the power amplifier 113 which amplifies the supplied signal. The amplified signal is then transmitted through the filter 114 from the antenna 101.

A signal received by the antenna 101 is processed for interference noise removal filters 107, 109 and amplified by the amplifier 108. The signal is then mixed with the local signal from the synthesizer 116 by the mixer 110, which applies an IF signal to the transmission/reception IF unit 115. The IF signal is bandwidth-limited and demodulated by the transmission/reception IF unit 115, and then decoded into a signal inherent with the radio transmission device by the control block 106 and the CPU 105. The decoded signal is supplied to the storage unit 104 and also to the receiver of the electroacoustic unit 103, by which it is converted into a speech signal.

It is assumed that the main communication unit 1 is singly compatible with a digital cellular communication system known as GSM, and can be made compatible with another digital cellular communication system known as PCN.

The digital cellular communication systems GSM, PCN differ from each other in that GSM uses a radio frequency band of 900 MHz and PCN uses a radio frequency band of 1.8 GHz, and GSM has a class-4 power output level of 2 W and PCN has a class-1 power output level of 1 W. Though GSM and PCN have other small protocol differences, they share other specifications.

If only the main communication unit 1 is used for communications in GSM, then, since the additional unit 2 is not added, no detected signal is supplied from the detector 118 to the CPU 105, and the control block 106 applies a control signal to the selector switch 117 to connect the power amplifier 113 to the transmission system, i.e., between the filters 112, 114.

Therefore, a signal to be transmitted from the transmission system is amplified by the power amplifier 113 for transmission at a power output level of 2 W.

At this time, the control block 106 applies a frequency control signal for GSM to the filters 107, 109, 112, 114. Therefore, a corresponding bias is applied to the input terminal 306 shown in FIG. 2 to vary the capacitance of the varactor diode 308, thereby giving a corresponding bandwidth to these filters 107,109, 112, 114. In this case, the bandwidth of 900 MHz is established for GSM.

At the same time, the CPU 105 establishes the GSM protocol for processing signals according to the GSM protocol.

Consequently, when only the main communication unit 1 is used, it operates for digital cellular communications of GSM.

When the additional unit 2 is attached to the main communication unit 1, the detector 118 outputs a detected signal to the CPU 105. The control block 106 outputs a control signal corresponding to PCN to control the selector switch 117 to disconnect the power amplifier 113 from the transmission system and connect the power amplifier 201 to the transmission system, i.e., between the filters 112, 114. The control block 106 also outputs a control signal to vary the oscillation frequency of the synthesizer 116 to vary the local signal frequency in the mixers 110, 111.

Accordingly, a signal is transmitted from the transmission system at a power output level of 1 W which corresponds to PCN. Since a different bias is simultaneously supplied from the control block 106 to the filters 107, 109, 112, 114, the capacitance of the varactor diode of each of these filters 107,109, 112, 114 is varied to set the filters 107, 109, 112, 114 to a bandwidth of 1.8 GHz corresponding to PCN.

At the same time, the CPU 105 establishes the PCN protocol for processing signals according to the PCN protocol.

Consequently, the main communication unit 1 with the additional unit 2 added thereto operates for digital cellular communications of PCN.

Accordingly, the radio communication device is capable of effecting communications selectively in the digital cellular communication systems GSM, PCN when the bandwidth of the filters 107, 109, 112, 114 in the main communication unit 1 is varied, the oscillation frequency of the Synthesizer 116 is varied, one of the power amplifiers 113, 201 is selected, and the protocol in the CPU 105 is changed. Switching from GSM to PCN can automatically be carried out because attachment of the additional unit 2 to the main communication unit 1 causes the detector 118 to apply a detected signal to the CPU 105 to enable the CPU 105 to change the filter bandwidth and the protocol and also to shift the selector switch 117.

For switching between GSM and PCN, only the power amplifiers 113, 201 are required to be changed while the main communication unit 1 remains as it is for communications. Therefore, since no different communication units or systems are required to be installed for communications in GSM and PCN, the radio communication device is highly advantageous economically. Since each of the power amplifiers 113, 201 are usually constructed as one device, the radio communication device is not unduly increased in size or complicated in circuit arrangement even when the power amplifier 201 is added as the additional unit 2 to the main communication unit 1. Therefore, the number and length of signal paths are not unduly increased, resulting in no substantial characteristic degradations.

While the power amplifier 201 requires various power supplies and control signals, they can be supplied from the main communication unit 1. Those power supplies and control signals which are required by the power amplifier 201 will not be described in detail as they have no bearing on the principles of the present invention.

If the power amplifier 113 is of the variable amplification type, then it can be used for communications in both GSM and PCN.

According to the present invention, as described above, communications in a first digital cellular communication system can be carried out by the main communication unit 1 only, and communications in a second digital cellular communication system can be carried out when some of the components of the main communication unit 1 and the protocol thereof are changed to match the second digital cellular communication system and one of the components is switched to the additional unit 2. Therefore, the radio communication device is capable of communications in the first and second communication systems which are different from each other, and the radio communication device has many shared components and hence offers economic advantages.

Each of the filters 107, 109, 112, 114 comprises a variable-bandwidth filter whose bandwidth can be varied to meet the first and second digital cellular communication systems. The CPU 105 can change its protocol according to the first or second digital cellular communication system in which the radio communication device is to operate. The power amplifier 113 in the transmission system is compatible with the first digital cellular communication system, and the power amplifier 201 of the additional unit 2 is compatible with the second digital cellular communication system. For switching between the first and second digital cellular communication systems, therefore, only switching between the power amplifier 113 in the transmission system and the power amplifier 201 of the additional unit 2 is required to be made. Inasmuch as only the power amplifier 201 of the additional unit 2 needs to be attached to or detached from the main communication unit 1 for switching between the first and second digital cellular communication systems, the radio communication device is highly advantageous economically.

The main communication unit 1 has the detector 118 for detecting when the additional unit 2 is attached to the main communication unit 1. When a detected signal is outputted from the detector 118, the CPU 105 varies the bandwidth of each f the filters 107, 109, 112, 114 and changes its protocol, and effects switching between the power amplifier 113 in the transmission system and the power amplifier 201 of the additional unit 2. Therefore, automatic switching can be achieved from the first digital cellular communication system to the second digital cellular communication system simply by attaching the additional unit 2 to the main communication unit 1.

Although a certain preferred embodiment of the present invention has been shown and described in detail, it should be understood that various changes and modifications may be made therein without departing from the scope of the appended claims.

What is claimed is:

1. A radio communication device comprising:

a main communication unit capable of effecting communications in a first digital cellular communication system; and an additional unit attachable to said main communication unit for effecting communications in a second digital cellular communication system which differs from said first digital cellular communication system;

said main communication unit including a first component having a function which is the same as a function of said additional unit, and other components compatible with both said first digital cellular communication system and said second digital cellular communication system;

the arrangement being such that switching is made from said first component to said additional unit when said additional unit is attached to said main communication unit, and thereby said radio communication device is capable of switching communication to said second digital cellular communication system;

said main communication unit including:

a transmission system including a power amplifier as said first component compatible with said first digital cellular communication system;

a variable-bandwidth filter having a bandwidth variable depending on said first digital cellular communication system and said second digital cellular communication system; and a central processing unit having a protocol which can be changed depending on said first digital cellular communication system and said second digital cellular communication system; and said additional unit including:

a power amplifier compatible with said second digital cellular communication system;

the arrangement being such that switching can be made between said power amplifier in said transmission system and said power amplifier of said additional unit.

2. A radio communication device according to claim 1, wherein said main communication unit comprises:

a detector for detecting when said additional unit is attached to said main communication unit;

the arrangement being such that when a detected is outputted from said detector, said central processing unit varies the bandwidth of said variable-bandwidth filter and changes the protocol of the central processing unit, and effects switching between said power amplifier in said transmission system and said power amplifier of said additional unit.

3. A radio communication device according to claim 1, wherein said bandwidth of said filter is variable depending on GSM and PCN, said protocol of said central processing unit can be changed depending on GSM and PCN, said power amplifier in said transmission system is compatible with GSM, and said power amplifier of said additional unit is compatible with PCN.

4. A radio communication device according to claim 2, wherein said bandwidth of said filter is variable depending on GSM and PCN, said protocol of said central processing unit can be changed depending on GSM and PCN, aid power amplifier in said transmission system is compatible with GSM, and said power amplifier of said additional unit is compatible with PCN.

* * * * *